United States Patent [19]

Culbertson et al.

[11] Patent Number: 4,571,363
[45] Date of Patent: Feb. 18, 1986

[54] POLYESTER FILM PRIMED WITH CROSSLINKED ACRYLIC POLYMERS

[75] Inventors: E. C. Culbertson, Greer; Grover L. Farrar, Greenville, both of S.C.

[73] Assignee: American Hoechst Corporation, Somerville, N.J.

[21] Appl. No.: 560,648

[22] Filed: Dec. 12, 1983

[51] Int. Cl.⁴ .................. B32B 27/08; B32B 27/36
[52] U.S. Cl. .................... 428/332; 428/480; 428/482; 428/483; 428/913; 430/157
[58] Field of Search ........... 428/483, 332, 480, 482; 524/365; 427/393.5; 430/157; 429/913

[56] References Cited

U.S. PATENT DOCUMENTS

| | | | |
|---|---|---|---|
| 3,819,773 | 6/1974 | Pears | 428/332 X |
| 4,214,035 | 7/1980 | Heberger | 428/483 X |

FOREIGN PATENT DOCUMENTS

| | | | |
|---|---|---|---|
| 00027699 | 3/1981 | European Pat. Off. | 428/480 |
| 803035229 | 3/1981 | European Pat. Off. | 428/480 |
| 00035614 | 9/1981 | European Pat. Off. | 428/483 |
| 803007590 | 9/1981 | European Pat. Off. | |
| 67/2988 | 5/1967 | South Africa | 428/483 |
| 1125460 | 8/1968 | United Kingdom | 428/480 |
| 1168171 | 10/1969 | United Kingdom | 428/480 |
| 1411564 | 10/1975 | United Kingdom | 428/480 |

*Primary Examiner*—Thomas J. Herbert
*Attorney, Agent, or Firm*—James C. Lydon; Michael J. Tully

[57] ABSTRACT

A prime coated oriented polyester film material is disclosed wherein the primer coating consists essentially of a crosslinked copolymer containing at least about 50% by weight of acrylic and/or methacrylic monomers and from about 1% to 15% by weight of a comonomer capable of inter-molecular crosslinking upon the application of heat, and from 0 to about 49% by weight of one or more halogen-free mono-ethylenically unsaturated monomers copolymerizable therewith.

The priming layer may be applied to the polyester film at any suitable stage during manufacture of the film, i.e., before or during the stretching operations, and is crosslinked after application by means of heat. The resultant primed polyester film is found to provide excellent adhesion to many organic solvent based coatings subsequently applied thereto, and to be reclaimable when reprocessed during the manufacture of polyester film without giving rise to significant or intolerable discoloration or degradation of the film.

23 Claims, No Drawings

POLYESTER FILM PRIMED WITH CROSSLINKED ACRYLIC POLYMERS

The present invention relates to oriented polyester film coated on one or both sides with crosslinked acrylic polymers which render the polyester film surface receptive to additional reprographic or matte coatings applied thereto, and to film containing the reclamation product of such coated film.

BACKGROUND OF THE INVENTION

Oriented polyester film, particularly biaxially oriented film composed of polyethylene terephthalate (PET), is widely used as a base for drafting film, photographic film and reprographic film, as well as for packaging and labelling applications.

Because PET film is hydrophobic and is not readily receptive to coating in most applications where the film is to serve as a base or support for other coatings, it must be first coated on one or both sides with a primer coating which adheres to the film and is receptive as well to other coatings applied to it. For example, U.S. Pat. Nos. 2,627,088 and 2,698,240 teach a primer coating for PET film comprising a terpolymer composition of vinylidene chloride, acrylic ester and itaconic acid. This primer layer is said to have excellent adhesion to the polyester surface and to water or alcohol based photographic gelatin layers subsequently coated thereon.

Another known PET film primer includes copolymers of a vinylhalogenoester, such as vinylchloroacetate which may be copolymerized with numerous different monomers such as acrylic and methacrylic acids, esters and amides, olefins and vinyl alcohol as disclosed in U.S. Pat. No. 3,674,531. Such copolymers may also be crosslinked by the inclusion of melamine or urea formaldehyde resins in the composition. The primed PET film is stated to exhibit enhanced adhesion to a variety of coatings applied thereto, including reprographic coatings.

While some of these and other polyester film primer layers are effective in enhancing the adhesive qualities of PET film, it is important for the film manufacturer that scrap film made during production must be recyclable through the film-forming process. Scrap film is normally comminuted, melted, extruded into the form of pellets, mixed with fresh virgin polyester, re-melted and re-fed to the film-forming extruder. Temperatures of about 270° C. to 310° C. may be encountered during such processing of PET reclaim film. Many of the primer compositions discussed above are not stable at such temperatures and tend to impart an undesirable yellow or black discoloration to finished oriented PET film containing significant amounts of such primed reclaim film, particularly after repeated passes through the extruder. Such is the case with the vinylidene chloride-containing polymers used as PET primer layers and disclosed in U.S. Pat. Nos. 2,627,088 and 2,698,240. It is also the case with primer layers based on copolymers containing vinyl chloroacetate as disclosed in U.S. Pat. No. 3,674,538. It has been found that discoloration and degradation of these primer layers during the reclaim process is most likely attributable to the evolution of chlorine gas or hydrogen chloride in the case of chlorine-containing primer layers.

Another known primer is the thermoset, acrylic or methacrylic coatings taught in U.S. Pat. No. 3,819,773, which can be applied to the PET film in the plant from aqueous medium. Such a primer layer enhances the adhesion of organic solvent based reprographic and drafting layers applied thereto. This patent also discloses that film primed with the thermoset acrylic coatings described therein may be reclaimed in the film forming extruder by mixing it with 50% by weight or more of virgin polyester and refeeding the mixture to the film-forming extruder. Patentee indicates that problems of discoloration or degradation caused by certain prior art primer coatings are reduced. While this is true in comparison with the chlorine-containing primers discussed above, the acrylic primer coatings of this patent crosslinked using the resinous crosslinking agents disclosed therein still are found to give rise to an undesirable yellowing of finished film containing such primed film as reclaim, particularly when compared to film based solely on virgin polymer.

SUMMARY OF THE INVENTION

It has now been discovered that PET film primer coated with a crosslinked acrylic copolymer containing from about 1 to about 15% by weight of a comonomer capable of intermolecular crosslinking by the application of heat can be successfully reclaimed and exhibits markedly less color degradation than the thermoset acrylics containing resinous crosslinking agent as disclosed in U.S. Pat. No. 3,819,773 referred to above.

The priming layer may be applied to the polyester film at any suitable stage during manufacture of the film, i.e., before or during the stretching operations, and is crosslinked after application by means of heat. The resultant primed polyester film is found to provide excellent adhesion to many organic solvent based coatings subsequently applied thereto, and to be reclaimable when reprocessed during the manufacture of polyester film without giving rise to hardly any appreciable discoloration or degradation of the film.

DETAILED DESCRIPTION OF THE INVENTION

The preferred oriented polyester film base for the purposes of this invention is made from polyethylene terephthalate, although the invention is equally applicable to film based on a crystallizable polyester resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus. For example, the polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

The film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range of from about 215° C. and 235° C.

The coating of this invention is preferably applied in the form of an aqueous dispersion or emulsion in line at one of two stages during the film manufacture: the pre-draw stage at the point between the casting of the amorphous sheet and the first stretch or the inter-draw stage subsequent to the uniaxial drawing but prior to biaxial drawing such as disclosed in U.S. Pat. No. 3,819,773. Normally, the heat applied to the film during the stretching or final conditioning stages is sufficient to evaporate off the water and other volatiles and dry and crosslink the primer coating.

In one preferred embodiment, the primer coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, after longitudinal stretching, the film is coated by any of the well known techniques employed in the art. For example, coating may be effected by roller coating, spray coating, gravure coating, slot coating or immersion coating. In a preferred embodiment, the polyester film is coated by means of gravure roller coating. Also, the uniaxially drawn film is preferably subjected to a corona discharge by a corona discharge apparatus prior to coating as is known in the art. The discharge treatment decreases the hydrophobic character of the polyester film surface, which permits water based coating to more easily wet the surface and thus improve the adhesion of the coating to the surface.

The acrylic copolymers used as primer layers according to this invention consist essentially of at least about 50% by weight of one or more polymerized acrylic and/or methacrylic monomers and from about 1% to 15% by weight of a copolymerizable comonomer which in its copolymerized state is then capable of inter-molecular crosslinking by the application of heat without the addition of a separate resinous crosslinking agent.

The acrylic component of the primer copolymers is preferably present at a level of from about 50 to 99% by weight and preferably comprises an ester of acrylic acid or methacrylic acid, especially an alkyl ester wherein the alkyl group contains up to ten carbon atoms such as methyl, ethyl, n-propyl, isopropyl, n-butyl, isobutyl, tertbutyl, hexyl, 2-ethyl, hexyl, heptyl and n-octyl. Acrylic copolymers derived from a lower alkyl ($C_1$ to $C_4$) acrylate, especially ethyl acrylate, together with a lower alkyl methacrylate provide particularly effective adhesion between the polyester film and superimposed reprographic or matte layers. Primer copolymers comprising an alkyl acrylate, e.g. ethyl acrylate or butyl acrylate, together with an alkyl methacrylate, e.g. methyl methacrylate, desirably in a total molar proportion in the range of about 70 to 95 weight percent, are particularly preferred. The acrylate comonomer of such acrylic/methacrylic combinations is preferably present in a proportion in the range 15 to 65 mole percent and the methacrylate comonomer preferably in a proportion exceeding that of the acrylate comonomer generally by an amount in the range of 5 to 20 mole percent. The methacrylate is preferably present in a proportion in the range of 35 to 85 mole percent.

Examples of suitable crosslinking comonomers include N-methylol acrylamide, N-methylol methacrylamide and their corresponding ethers; epoxide materials such as glycidyl acrylate, glycidyl methacrylate and allylglycidyl ether; carboxyl containing monomers such as crotonic acid, itaconic acid or acrylic acid; anhydrides such as maleic anhydride or itaconic anhydride; hydroxy containing monomers such as allyl alcohol and hydroxy ethyl or propyl acrylate or methacrylate; amides such as acrylamide, methacrylamide or maleamide; and isocyanates such as vinylisocyanate or allylisocyanate.

Preferred comonomers from the above are N-methylolacrylamide and N-methylolmethacrylamide, mainly because copolymer chains containing one of these monomers are capable of condensing with one another with the aplication of heat to form the desired inter-molecular crosslinking. In the case of copolymers containing the other functional monomers, it is necessary to form blends of two or more copolymers containing different functional comonomers to achieve the desired crosslinking, e.g. blending an acrylic/crotonic acid copolymer with an acrylic copolymer containing isocyanate, epoxide or N-methylol functionality capable of reacting with acidic functional groups.

Specific additional combinations of such blended acrylic copolymers include copolymers containing monomers having epoxide functionality combined with copolymers containing monomers having amine, acid anhydride, carboxyl, hydroxyl or N-methylol functionality; copolymers containing monomers having N-methylol or N-methylol ether functionality combined with copolymers containing monomers having carboxyl, hydroxyl, or amine functionality; copolymers containing monomers having isocyanate functionality combined with copolymers containing monomers having carboxyl or hydroxyl functionality; and so forth. Preferably, the functional monomers present in the mixed copolymer systems are present in approximately equimolar amounts.

The acrylic copolymers also may contain up to about 49% by weight of one or more halogen-free non-acrylic monoethylenically unsaturated monomers interpolymerized therewith. Suitable comonomers include dialkyl maleates such as dioctyl maleate, di-isooctyl maleate and dibutyl maleate; vinyl esters of versatic acid; vinyl acetate, styrene, acrylonitrile and similar materials.

The preferred crosslinking mixed copolymer compositions for the purposes of this invention are approximately 50/50 blends of an ethyl acrylate/methyl methacrylate/crotonic acid copolymer with an ethyl acrylate/methyl methacrylate/glycidylacrylate copolymer; blends of an ethyl acrylate/methyl methacrylate/methacrylamide copolymer with an ethylacrylate/methyl methacrylate/N-methylolacrylamide copolymer; and compositions based on copolymers of ethyl acrylate/methyl methacrylate/N-methylolacrylamide such as copolymers containing from about 50 to 99% by weight of acrylic and/or methacrylic monomers, 0 to 49% by weight of the mono-ethylenically unsaturated monomer and about 1 to 15% by weight N-methylolacrylamide. More preferred are copolymers containing from about 70 to 90% by weight of acrylic and/or methacrylic monomers, about 0 to 25% by weight of the mono-ethylenically unsaturated monomer, and from about 5 to 10% by weight N-methylolacrylamide.

As pointed out above, the polymeric acrylic primer composition of this invention does not require the presence of an external crosslinking agent such as a melamine or urea/formaldehyde condensate which has been found to cause a yellowing of PET film upon reclamation. Thus, the term consisting essentially of as used above is intended to exclude the presence of any significant amounts of such external, separately added crosslinking agents such as is specified in the disclosure of U.S. Pat. No. 3,819,773 referred to above.

Although self-crosslinking acrylic copolymers analogous to those described above have been generally described in the prior art as useful primer materials for polyester film, such as in European Patent Applications Nos. 0027699 and 0035614, neither of these patents appreciates the reclaimability of the primed film or most particularly the improved reclaimability of film primed with self-crosslinking acrylics as compared with film primed with acrylics crosslinked by the separate addition of a resinous crosslinking agent such as a melamine/formaldehyde or urea formaldehyde resin.

The primer coating of the present invention is applied to the base polyester film preferably as an aqueous dispersion or latex and at a solids concentration within the range of about 0.5 to 15%, preferably about 3 to 10%. The preferred solids level is such as to yield a final dry coating thickness within the range of about $10^{-7}$ to $10^{-5}$ inch, which translates into a solids level on a dry weight basis of from 0.00305 g/m$^2$ to 0.305 g/m$^2$. The preferred thickness range of the dried copolyester primer is from $6.0 \times 10^{-7}$ to $2.0 \times 10^{-6}$ inch, with $1.0 \times 10^{-6}$ inch being the target thickness.

The coating may be applied to one or both sides of the film, or it may be applied to one side only with optionally a different coating applied to the opposite side. Additives known in the art may be present in the coating formulation such as anti-static agents, wetting agents, surfactants, pH regulating agents, anti-oxidants, dyes, pigments, slip agents such as colloidal silica, and the like. Normally, it is desirable to include a surfactant to enhance the wettability of the aqueous coating to the base polyester film.

The primer coatings of this invention exhibit excellent heat stability and accordingly any scrap primed film made during production can be mixed with fresh polyester, re-melted and re-fed to the film-forming extruder to produce oriented film. The terms "fresh" or "virgin" polyester as used herein refer to polyester which is not itself the reclamation product of finished articles such as film or fiber, but is rather used for the first time in the manufacture of such articles. Such film produced containing from about 5 up to about 70% by weight of coated scrap reclaim, preferably about 50% by weight of each, exhibits good quality, color and appearance with very little, if any, perceptible degradation of properties due to the presence of the coating impurity. Thus the primed film of this invention offers a distinct commercial advantage to the film manufacturer over many other primed films, such as films primed with vinylidene chloride containing polymers as disclosed in U.S. Pat. Nos. 2,627,088 and 2,698,240, which tend to degrade and discolor when reclaimed as set forth above. Similar advantages are also present in comparison to the thermoset acrylics containing resinous crosslinking agents as disclosed in U.S. Pat. No. 3,819,773 or the vinyl acetate polymers containing resinous crosslinking agents as disclosed in British Pat. No. 1,497,657.

The reextruded film of this invention may contain the coated reclaim film of this invention to the extent that such reextruded film includes up to 1.0% by weight of the crosslinked acrylic coating, more preferably from about 0.01% to about 0.50%. The reextruded film may itself serve as a finished film, or as a base film upon which crosslinked acrylic coatings described herein or other primer coatings of the prior art may be applied.

Polyester film primed with the composition of this invention has excellent utility as a film base for the production of photosensitive reprographic films. Such films are prepared by forming a coating on a surface of the primed polyester film of a photosensitive composition comprising an organic solvent solution of a resinous binder containing or impregnated with a light-sensitive diazonium compound, and drying said coating. Resinous binders suitable for this purpose include cellulose acetate butyrate, cellulose acetate, cellulose acetate propionate as well as vinyl polymers such as polyvinyl acetate. Suitable solvents include acetone, methyl ethyl ketone, methyl isobutyl ketone, ethylene glycol monomethyl ether and mixtures thereof. These reprographic coatings and their method of application and use are well known in the art.

Similarly the primed polyester film of this invention forms an excellent substrate for the application of matte coatings which render the film suitable for use as a drawing or drafting material. These matte coatings may be based on an organic composition comprising a resinous binder and a finely divided particulate material which serves as a "toothing agent." The resinous binder may include the resinous materials referred to above as well as acrylic or methacrylic resins. The organic solvents may also include those listed above. Particulate materials include finely divided (less than 10 micron particle size) clays or silica. Other ingredients such as thickeners or dispersing agents may also be present in such matte formulations. Similar matte formulations are disclosed for example in British Pat. No. 1,072,122 and U.S. Pat. No. 3,624,021.

Yet another application of the primed film of this invention is as a packaging or label material. The primed films demonstrate improved adhesion to organic solvent based printing inks when compared with unprimed film. These inks may comprise organic solvent dispersions or solutions of pigments and or dyes in combination with acrylic resins or other resins and thickening agents.

Accordingly, the excellent adhesive qualities of polyester film primed with the crosslinked acrylic copolymer layers of this invention to organic solvent based coatings applied thereto renders such film of more universal utility to the manufacturer of finished reprographic, graphic and packaging products.

Reprographic adhesion (Repro) was evaluated using a lacquer comprising (in parts by weight) 9 parts cellulose acetate butyrate of "20 second" grade dissolved in a mixture of 88 parts ethylene glycol monomethyl ether (methyl cellosolve) and 3 parts methyl ethyl ketone with Rhodamine B dye added for color (3 parts of a 1% Rhodamine B dye in n-butanol). The lacquer was applied to the coated surface of the film by means of a wire-wound bar, Meyer rod No. 70, and cured in an oven for 5 minutes at 60° C. The coating was scored with a cross-hatched pattern by means of scalpel. A strip of adhesive tape (Scotch tape 610) was adhered to the cross-hatched area, rubbed with fingernail to insure intimate contact and then pulled rapidly from the film. The amount of lacquer remaining in the cross-hatched area was expressed as a percentage of the amount remaining, i.e. no lacquer removed=100% adhesion, all lacquer removed=0% adhesion with intermediate adhesion values being assessed in terms of the proportion of lacquer area remaining adhered to the film. The test was done twice on two sheets (total of 4 areas tested) and the adhesion value reported as that of the test area showing the most failure.

Repro test results demonstrating less than 95% adhesion are not generally considered acceptable, whereas test results approaching or equaling 100% adhesion are the target standard.

The following examples are illustrative of the invention.

EXAMPLE I

A latex comprising 4.5% by weight solids of a copolymer of 60 weight percent of methyl methacrylate, 35 weight percent ethyl acrylate, and 5 weight percent of N-methylolacrylamide, and a surfactant was applied as a primer coating to polyester film by the following procedure:

Virgin polyethylene terephthalate polymer was melted and extruded through a slot die onto a casting drum maintained at a temperature of about 20° C. The melt froze to form a cast sheet, was longitudinally stretched at a draw ratio of approximately 3.6:1 while maintained at a temperature of about 80° C.

The longitudinally drawn film was corona treated by a corona discharge apparatus and thereinafter coated with the latex described above by reverse gravure coating.

The corona treated, longitudinally drawn, coated film was dried at a temperature of about 100° C. Thereafter, the film was stretched, in the transverse direction at a draw ratio of 3.6:1 to produce a biaxially drawn film. The biaxially drawn film was heat set at a temperature of 230° C. These heat treatments resulted in the crosslinking of the primer coating. The dry weight of the coating was about 0.035 g/m² with a coating thickness of about $1 \times 10^{-6}$ inch and a base film thickness of about 3 mils.

EXAMPLE 2

Example 1 was repeated except in this instance the polyethylene terephthalate polymer fed to the film-forming extruder comprised a mixture of about 50% by weight of virgin polymer and 50% by weight of reclaim polymer produced by the reclamation (comminution, extrusion at 290° C. and pelletization) of the prime coated film made in accordance with Example 1.

EXAMPLE 3

Example 1 was repeated except in this instance the copolymer present in the latex contained about equimolar proportions of ethyl acrylate and methyl methacrylate copolymerized with 5 weight percent of methacrylamide, and further containing 20% of a melamine/formaldehyde resinous crosslinking agent on a dry weight basis.

EXAMPLE 4

Example 3 was repeated except in this instance the polyethylene terephthalate polymer fed to the film-forming extruder comprised a mixture of about 50% by weight of virgin polymer and 50% by weight of reclaim polymer produced by the reclamation of the prime coated film made in accordance with Example 3.

Each of the films produced by Examples 1–4 were tested for reprographic adhesion as set forth above and found to provide greater than 95% adhesion as compared with a control uncoated film which exhibited 0% adhesion.

The improvement in terms of reclaimability of polyester film primed with the crosslinked acrylic copolymers of this invention as compared with prior art primed films containing coatings based on thermoset acrylic primers is established by comparative reclaim tests based on the coated films of Examples 2 and 4 above. In both cases 3 mil PET film was coated at a dry thickness of about $1 \times 10^{-6}$ in.

The reclaimability of these two films is evaluated by comminuting each coated film sample into the form of a flake, passing the flake through a strand extruder at about 290° C. to melt the flake and cutting the resulting strand extrudate into the form of pellets. The resulting pellets are each then reextruded at 290° C. and repelletized two additional times.

A visual evaluation of the relative discoloration of the resulting heat treated pellet samples demonstrates that pellets containing the coated film of Example 4 are markedly yellower and darker than the pellets containing the coated film of Example 2.

What we claim is:

1. An oriented self-supporting polyester film prepared by melt extruding a substantially amorphous polyester film consisting essentially of a mixture of fresh polyester and primer coated reclaim polyester and thereafter orienting the film by stretching in one or two directions and heat setting the film, said primer coated reclaim polyester being the comminution product of a primer coated oriented polyester film having a continuous cross-linked acrylic coating on one or both sides thereof, said acrylic coating consisting essentially of a copolymer of at least about 50 percent by weight of polymerized acrylic and/or methacrylic monomers, from about 1 to about 15% by weight of a copolymerized functional group-containing comonomer which in the copolymerized state is capable of inter-molecular crosslinking by the application of heat, and from about 0 to 49% by weight of one or more halogen-free monoethylenically unsaturated copolymerized monomers.

2. The film of claim 1 wherein said primer coating has a dry thickness within the range of about $10^{-7}$ to $10^{-5}$ inch.

3. The film of claim 2 containing about 30 to 95 weight percent of fresh polyester and about 5 to 70 weight percent of primer coated reclaim polyester.

4. The film of claim 3 wherein said self supporting polyester film is biaxially oriented polyethylene terephthalate film.

5. The film of claim 4 wherein said functional group present in said functional group-containing monomer is selected from the group consisting of amine, amide, acid anhydride, N-methylol, carboxyl, hydroxyl, epoxy and isocyanate.

6. The film of claim 5 wherein said functional group-containing comonomer is selected from the group consisting of N-methylol acrylamide and N-methylolmethacrylamide.

7. The film of claim 6 wherein said acrylic coating comprises a copolymer of about 85 to 99% by weight of a copolymer of a lower alkyl acrylate and a lower alkyl methacrylate, and from about 1 to 15% by weight N-methylol acrylamide.

8. The film of claim 7 wherein said primer coating contains about 5 to 10% by weight of N-methylol acrylamide.

9. The film of claim 7 wherein said acrylate monomer is ethyl acrylate and said methacrylate monomer is methyl methacrylate.

10. The oriented self supporting polyester film of claim 1 which is itself primer coated with a continuous cross linked acrylic coating on one or both sides thereof, said acrylic coating being applied to said film from an aqueous medium prior to stretching in one direction or subsequent to stretching in one direction but prior to stretching in a mutually perpendicular direction, said acrylic coating consisting essentially of a copolymer of at least about 50 percent by weight of polymerized acrylic and/or methacrylic monomers, from about 1 to about 15% by weight of a copolymerized functional group-containing comonomer which in the copolymerized state is capable of inter-molecular crosslinking by the application of heat, and from about 0 to 49% by weight of one or more halogen-free monoethylenically unsaturated copolymerized monomers.

11. The film of claim 10 wherein said primer coating has a dry thickness within the range of about $10^{-7}$ to $10^{-5}$ inch.

12. A biaxially oriented polyester film comprising an intimate mixture of from about 30 to 95% by weight of fresh polyester and correspondingly about 70 to 5% by weight of the coated film of claim 11, said coated film characterized in that said coated film is comminuted, melted at a temperature within the range of about 270° C. to about 310° C., and mixed with fresh polyester prior to extruding and biaxially orienting said film.

13. The film of claim 12 containing from about 0.01 to about 1.0% by weight of said coating.

14. The film of claim 11 wherein said self supporting polyester film is biaxially oriented polyethylene terephthalate film.

15. A light-sensitive film comprising the film of claim 12 having a light-sensitive layer comprising a resinous binder containing or impregnated with a light-sensitive diazonium salt applied directly to said primer coating.

16. A graphic film comprising the film of claim 14 having a matte layer comprising a resinous binder containing a finely divided particulate material applied directly to said primer coating.

17. The film of claim 14 having a printing ink composition applied directly to at least a portion of said primer coating.

18. The film of claim 14 wherein said functional group present in said functional group-containing monomer is selected from the group consisting of amine, amide, acid anhydride, N-methylol, carboxyl, hydroxyl, epoxy and isocyanate.

19. The film of claim 18 wherein said functional group-containing comonomer is selected from the group consisting of N-methylol acrylamide and N-methylolmethacrylamide.

20. The film of claim 19 wherein said functional group-containing comonomer is present at a level of about 5 to 10% by weight.

21. The film of claim 19 wherein said primer coating comprises a copolymer of about 85 to 99% by weight of a copolymer of a lower alkyl acrylate and a lower alkyl methacrylate, and from about 1 to 15% by weight N-methylol acrylamide.

22. The film of claim 21 wherein said primer coating contains about 5 to 10% by weight of N-methylol acrylamide.

23. The film of claim 21 wherein said acrylate monomer is ethyl acrylate and said methacrylate monomer is methyl methacrylate.

* * * * *